United States Patent
Ji et al.

(10) Patent No.: US 10,291,450 B2
(45) Date of Patent: May 14, 2019

(54) METHOD AND APPARATUS FOR TRANSMITTING AND RECEIVING DATA BETWEEN TERMINAL AND BASE STATION IN MOBILE COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Hyoungju Ji, Seoul (KR); Daesik Hong, Seoul (KR); Younsun Kim, Seongnam-si (KR); Hyunsoo Kim, Seoul (KR); Jonghyun Bang, Seongnam-si (KR)

(73) Assignees: Samsung Electronics Co., Ltd., Suwon-si (KR); Industry-Academic Cooperation Foundation, Yonsei University, Seoul (KR)

( * ) Notice: Subject to any disclaimer, the term of this patent is extended or adjusted under 35 U.S.C. 154(b) by 0 days.

(21) Appl. No.: 15/563,546

(22) PCT Filed: Mar. 31, 2016

(86) PCT No.: PCT/KR2016/003365
§ 371 (c)(1),
(2) Date: Sep. 29, 2017

(87) PCT Pub. No.: WO2016/159701
PCT Pub. Date: Oct. 6, 2016

(65) Prior Publication Data
US 2018/0091342 A1 Mar. 29, 2018

(30) Foreign Application Priority Data
Mar. 31, 2015 (KR) .................. 10-2015-0045705

(51) Int. Cl.
*H04L 27/26* (2006.01)
*H04W 72/04* (2009.01)
(Continued)

(52) U.S. Cl.
CPC .......... *H04L 27/2602* (2013.01); *H04L 5/001* (2013.01); *H04L 5/0091* (2013.01);
(Continued)

(58) Field of Classification Search
CPC . H04W 24/10; H04W 74/08; H04W 74/0833; H04W 72/0453; H04W 72/12;
(Continued)

(56) References Cited

U.S. PATENT DOCUMENTS 6,359,924 B1 * 3/2002 Kuhn ..................... H04B 1/713
375/132
6,507,571 B1 * 1/2003 Yamamoto ......... H04B 1/70752
370/335
(Continued)

FOREIGN PATENT DOCUMENTS

KR 20100113107 A 10/2010
KR 20100113570 A 10/2010

OTHER PUBLICATIONS

Ericsson et al.; "WF on LBT Schemes for LAA"; 3GPP TSG RAN WG1 #80; R1-150785; Athens, Greece; Feb. 9-13, 2015; 3 pages.
(Continued)

*Primary Examiner* — Sophia Vlahos

(57) ABSTRACT

The present disclosure relates to a communication technique for converging a 5G communication system for supporting a higher data rate beyond a 4G system with an IoT technology, and a system therefor. The present disclosure can be applied to intelligent services (for example, smart home, smart building, smart city, smart car or connected car, healthcare, digital education, retail, security and safety-
(Continued)

related service, and the like) on the basis of a 5G communication technology and an IoT-related technology. The present invention relates to a method for transmitting and receiving data, and a method for receiving data by a terminal according to the present invention comprises: receiving, from a base station, a random sequence generation parameter for generating a random sequence including a random variable in a first band; generating the random sequence using the received parameter; and performing decoding on the basis of the random variable included in the random sequence in a second band.

11 Claims, 13 Drawing Sheets

(51) Int. Cl.
*H04W 72/12* (2009.01)
*H04L 5/00* (2006.01)
*H04L 27/00* (2006.01)
*H04W 74/08* (2009.01)

(52) U.S. Cl.
CPC ..... *H04L 27/0006* (2013.01); *H04W 72/0453* (2013.01); *H04W 72/12* (2013.01); *H04W 74/0808* (2013.01)

(58) Field of Classification Search
CPC ......... H04W 74/0816; H04W 74/0808; H04W 74/0825; H04W 72/042; H04W 72/0493; H04W 74/085; H04W 74/0858; H04L 27/2602; H04L 27/0006
See application file for complete search history.

(56) References Cited

U.S. PATENT DOCUMENTS

| | | | |
|---|---|---|---|
| 8,787,181 | B2 | 7/2014 | Gaal et al. |
| 8,811,305 | B2 | 8/2014 | Li et al. |
| 8,861,452 | B2 | 10/2014 | Barbieri et al. |
| 8,874,124 | B2 | 10/2014 | Clegg |
| 2005/0195921 | A1* | 9/2005 | Abe ............... H04B 1/7107 375/340 |
| 2010/0135493 | A1 | 6/2010 | Yoon et al. |
| 2012/0057703 | A1* | 3/2012 | Hsuan ............ H04L 12/5692 380/268 |

OTHER PUBLICATIONS

Ericsson; "WF on LBT Schemes for LAA"; 3GPP TSG RAN WG1 #80; R1-150819; Athens, Greece; Feb. 9-13, 2015; 3 pages.

* cited by examiner

METHOD AND APPARATUS FOR TRANSMITTING AND RECEIVING DATA BETWEEN TERMINAL AND BASE STATION IN MOBILE COMMUNICATION SYSTEM

CROSS-REFERENCE TO RELATED APPLICATION(S)

The present application claims priority under 35 U.S.C. § 365 to International Patent Application No. PCT/KR2016/003365 filed Mar. 31, 2016, entitled "METHOD AND APPARATUS FOR TRANSMITTING AND RECEIVING DATA BETWEEN TERMINAL AND BASE STATION IN MOBILE COMMUNICATION SYSTEM", and through Korean Patent Application No. 10-2015-0045705, which was filed on Mar. 31, 2015, each of which are incorporated herein by reference into the present disclosure as if fully set forth herein.

TECHNICAL FIELD

The present invention relates to a method and apparatus for communicating data between a terminal and a base station and, in particular, to a data transmission timing estimation method and apparatus of a terminal which estimates the data transmission timing based on the control information shared between the terminal and the base station.

BACKGROUND

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Mobile communication systems were developed to provide subscribers with voice communication services on the move. Recently, mobile communication systems have evolved to the level of supporting high speed data communication services beyond the early voice-oriented services. However, the resource shortage and user requirements for higher speed services are spurring evolution towards increasingly more advanced mobile communication systems.

As one of the next-generation mobile communication systems to meet such requirements, standardization for an LTE system is underway in the $3^{rd}$ Generation Partnership Project (3GPP). LTE is a technology designed to provide high speed packet-based communication of up to 100 Mbps and aims at commercial deployment around 2010. In order to accomplish the aim, a discussion is being held on several schemes: one scheme for reducing the number of nodes located in a communication path by simplifying a configuration of the network, and another scheme for maximally approximating wireless protocols to wireless channels.

Recently, a technique called licensed assisted access (LAA) has been proposed to improve frequency utilization efficiency through carrier aggregation (CA) across licensed and unlicensed bands.

In an LAA system in which a channel access and data transmission timing is determined based on channel conditions, however, a terminal has to perform blind decoding in the time domain to decode data correctly, and this may cause significant loss in view of terminal complexity and energy consumption as well as accuracy.

There is therefore a need of research for a method for decoding data efficiently.

SUMMARY

The present invention has been conceived to fulfil the above necessity and aims to provide a method for estimating data transmission timing based on use of control information shared between a base station and a terminal to decode the data transmitted in an unlicensed frequency band efficiently.

In accordance with an aspect of the present invention, a data reception method of a terminal in a mobile communication system operating in a first and second band includes receiving, from a base station, random sequence generation parameters for generating a random sequence including random variable in the first band, generating the random sequence using the parameters, and performing decoding based on the random variable included in the random sequence in the second band.

In accordance with another aspect of the present invention, a data transmission method of a base station in a mobile communication system operating in a first and second band includes transmitting, to a terminal, random sequence generation parameters for generating a random sequence including random variable in the first band, generating the random sequence using the random sequence generation parameters, and determining whether the second band is idle based on the random variable included in the random sequence.

In accordance with another aspect of the present invention, a terminal of a mobile communication system operating in a first and a second band includes a transceiver configured to transmit and receive signals to and from other network entities and a controller configured to receive, from a base station, random sequence generation parameters for generating a random sequence including random variable in the first band, generate the random sequence using the parameters, and decode based on the random variables included in the random sequence in the second band.

In accordance with still another aspect of the present invention, a base station of a mobile communication system operating in a first and second band includes a transceiver configured to transmit and receive signals to and from other network entities and a controller configured to transmit, to a terminal, random sequence generation parameters for generating a random sequence including random variable in the first band, generate the random sequence using the random sequence generation parameters, and determine whether the second band is idle based on the random variable included in the random sequence.

The data transmission timing estimation method of the present invention is advantageous in terms of making it possible for a terminal to decode data efficiently based on predetermined information.

DETAILED DESCRIPTION

Figure 1:
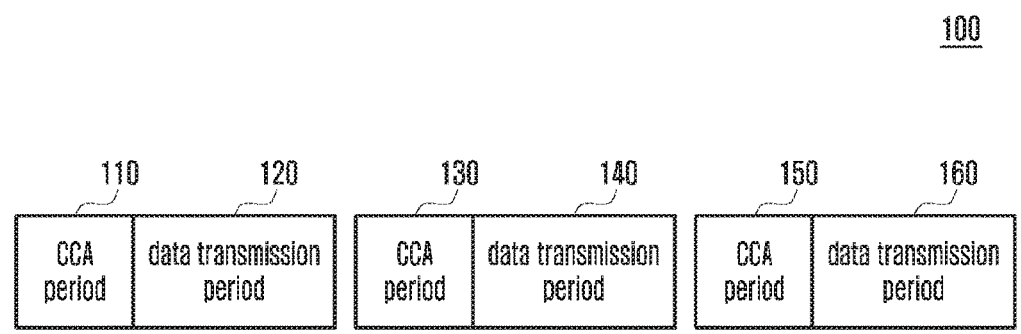
FIG. 1 is a diagram illustrating a frame structure of a frame-based LAA system.

Exemplary embodiments of the present invention are described in detail with reference to the accompanying drawings.

Detailed descriptions of well-known functions and structures incorporated herein may be omitted to avoid obscuring the subject matter of the present invention. This aims to omit unnecessary description so as to make clear the subject matter of the present invention.

For the same reason, some elements are exaggerated, omitted, or simplified in the drawings; and, in practice, the elements may have sizes and/or shapes different from those shown in the drawings. The same reference numbers are used throughout the drawings to refer to the same or like parts.

Advantages and features of the present invention and methods of accomplishing the same may be understood more readily by reference to the following detailed descriptions of exemplary embodiments and the accompanying drawings. The present invention may, however, be embodied in many different forms and should not be construed as being limited to the exemplary embodiments set forth herein. Rather, these exemplary embodiments are provided so that this disclosure will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus to produce a machine, such that the instructions which are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce an article of manufacture including instruction means which implement the function/act specified in the flowcharts and/or block diagrams. The computer program instructions may also be loaded onto a computer or other programmable data processing apparatus to cause a series of operational steps to be performed on the computer or other programmable apparatus and produce a computer implemented process such that the instructions which are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time, or may be performed in reverse order according to their functions.

According to various embodiments of the present invention, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a diagram illustrating a frame structure of a frame-based LAA system.

In reference to FIG. 1, a frame of the frame-based LAA system is comprised of fixed Clear Channel Assessment (CCA) periods 110, 130, and 150 and data transmission periods 120, 140, and 160 that repeat alternately.

In the LAA system, a base station performs channel assessment to check for instantaneous channel occupancy condition in an unlicensed frequency band during the CCA period and, if the unlicensed frequency band is idle, to carry out CA across a licensed frequency band and the unlicensed frequency band.

The CCA for assessing the unlicensed band channel occupancy condition can be performed in various ways. The CCA is performed in such a way of detecting the energy level of a received signal to determine whether the channel is preoccupied based on the energy level. In the case of using the energy detection technique, a base station or a terminal may measure the energy level of a signal received through an unlicensed frequency channel and, if the energy level is below a predetermined threshold, determine that the unlicensed frequency channel is idle. It may also be possible for CCA to use a matched filter detection, which is characterized by assessing similarity to the transmit signal with a filter or a cyclic-stationary feature detection that is characterized by using a probabilistic/statistical characteristic of the relationship between periodicity and cyclic prefix (CP) of a carrier and the transmit data to determine whether the channel is preoccupied.

CA is a technique introduced in long-term evolution-advanced (LTE-A) to achieve a higher throughput by using two or more component carriers (CCs) for transmission/reception. CA makes it possible to increase capacity by aggregation of multiple CCs even in a situation difficult to secure broadband frequency resources continuously; although the transmission bandwidth requirement of the international mobile telecommunications-advanced (IMT-Advanced) is up to 100 MHz, the present invention is not limited to the transmission bandwidth requirement.

In reference to FIG. 1, if it is determined that the corresponding frequency band is occupied by a device as a result of CCA performed during the CCA period 110, the base station cannot use corresponding resources until the next CCA period 130 arrives, and this may cause temporal resource waste.

In order to reduce resource waste, a load-based LAA system is proposed, the load-based LAA system being described with reference to FIG. 2.

Figure 2:
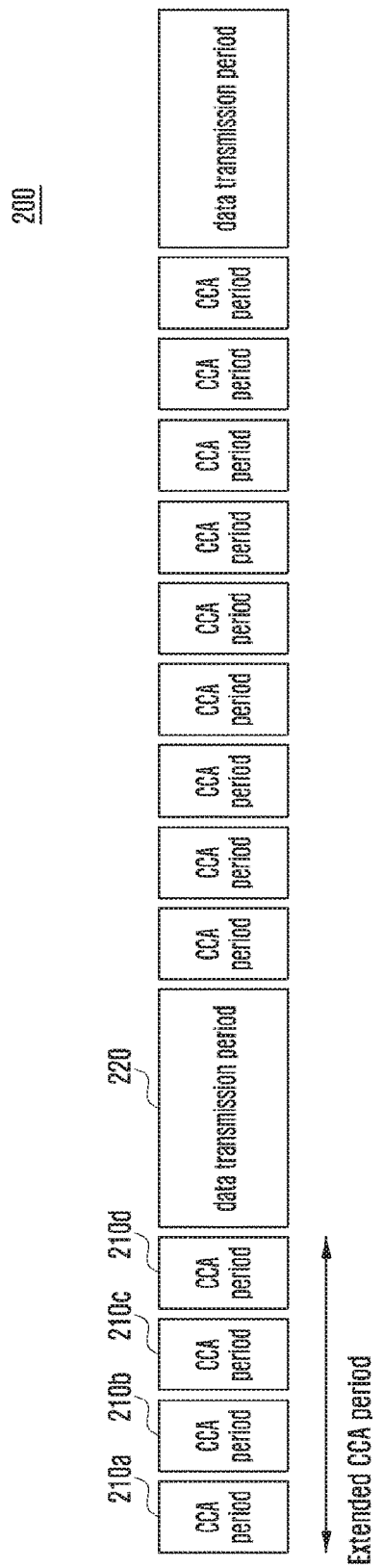
FIG. 2 is a diagram illustrating a frame structure of a load-based LAA system.

FIG. 2 is a diagram illustrating a frame structure of a load-based LAA system.

In reference to FIG. 2, a frame 200 of the load-based LAA system is comprised of a plurality of CCA periods 210a, 210b, 210c, and 210d and data transmission period 220 that repeat in a pattern.

In the load-based LAA system, if it is determined that the corresponding frequency band is occupied by a device as a result of CCA performed during a CCA period, the base station may iterate CCA continuously until it accesses the unlicensed band successfully, which is unlike the frame-based LAA system in which the base station waits for the next CCA period in such a situation. Iterating CCA across multiple consecutive CCS periods may be called extended CCA (eCCA), and the multiple consecutive CCA periods during which the CCA is performed may be called an eCCA period.

The base station may generate a random variable in a range defined for the LAA system and, if it is determined that the corresponding channel is idle as a result of CCA during the CCA period, decreases the random variable by 1. If the random variable reaches 0 while repeating CCA, the base station may attempt to access the channel immediately.

Figure 3:
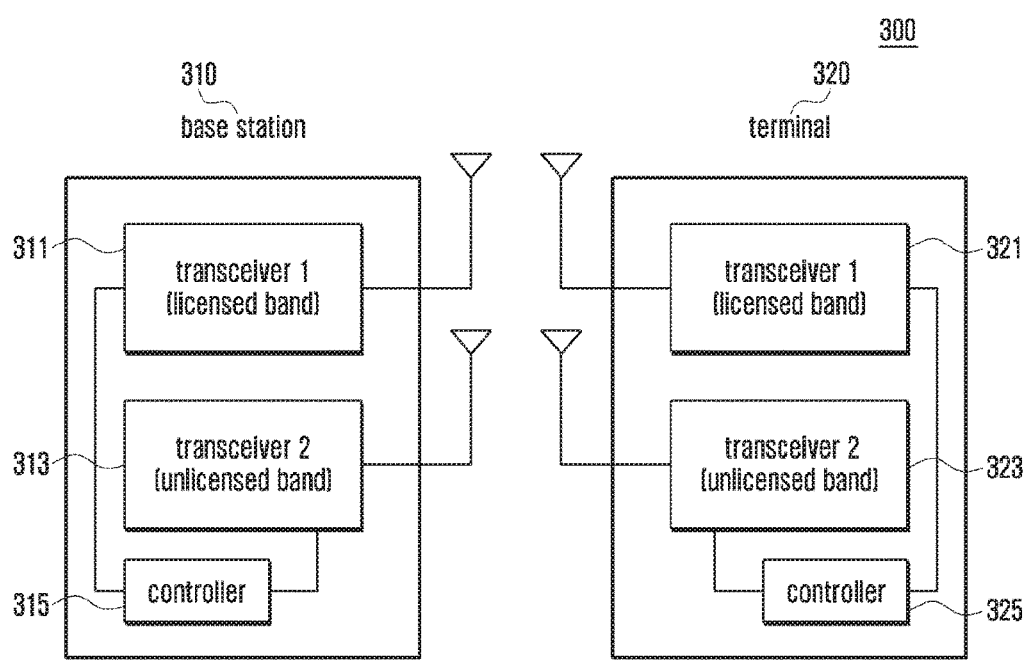
FIG. 3 is a diagram illustrating a configuration of an LAA system according to an embodiment of the present invention.

FIG. 3 is a diagram illustrating a configuration of an LAA system according to an embodiment of the present invention.

In reference to FIG. 3, the LAA system 300 may include a base station 310 and a terminal 320.

The base station 310 may include transceiver 1 311 for transmitting and receiving data and control signals in a licensed frequency band and transceiver 2 313 for performing CCA to detect the channel condition of an unlicensed frequency band and transmitting data. The base station 310 may include a controller 313 for performing eCCA to determine whether to use the unlicensed frequency band and, if it is determined to use the unlicensed frequency band, carry out CA across the licensed frequency band and the idle unlicensed frequency band.

The controller 315 may include a random sequence generator for generating a random sequence comprised of random variables for use in performing eCCA.

The random sequence generator may generate the random variables for use in eCCA in the form of a sequence (progression) (hereinafter referred to as "random sequence"). The controller 315 may also perform eCCA a number of times equal to one of the random variables included in the generated random sequence. For example, if the random sequence generator generates a random sequence of variables {4, 3, 2, . . . }, the controller may perform CCA 4 times, 3 times, and twice per eCCA. The random variables included in the random sequence may be generated arbitrarily, and the random variable generation method of the base station is described later in detail.

The base station may be configured with at least one transceiver and at least one controller, and the numbers of the transceivers and controllers may increase or decrease according to the number of CCs to aggregate.

The terminal 320 may include transceiver 1 321 for receiving the signal transmitted by the transceiver 1 311 of the base station 310 in the licensed frequency band and transceiver 2 323 for receiving the signal transmitted by the transceiver 2 313 of the base station 310. The terminal 320 may also include a controller 325 for performing demodulation and decoding on the data received from the base station 310.

The controller 325 may include a random sequence generator for generating a random sequence identical to that generated by the base station 310.

The random sequence generator may generate a random sequence identical to that generated by the base station 310, and the controller 325 may perform decoding based on the random variables included in the random sequence. For example, the random sequence generator generates a random sequence of random variables {4, 3, 2, . . . } that is identical to that generated by the base station 310, the controller may perform decoding after four CCA periods first, after three CCA periods in the next round, and after two CCA periods in the round after the next round. In the case of performing decoding in this way, it may be possible to perform decoding efficiently in view of accuracy, complexity, and energy consumption in comparison with blind decoding. The random variable-based decoding operation of the controller is described later in detail.

The terminal may be configured with at least one transceiver and at least one controller, and the numbers of the transceivers and controllers may increase or decrease according to the number of CCs to be aggregated.

Figure 4:
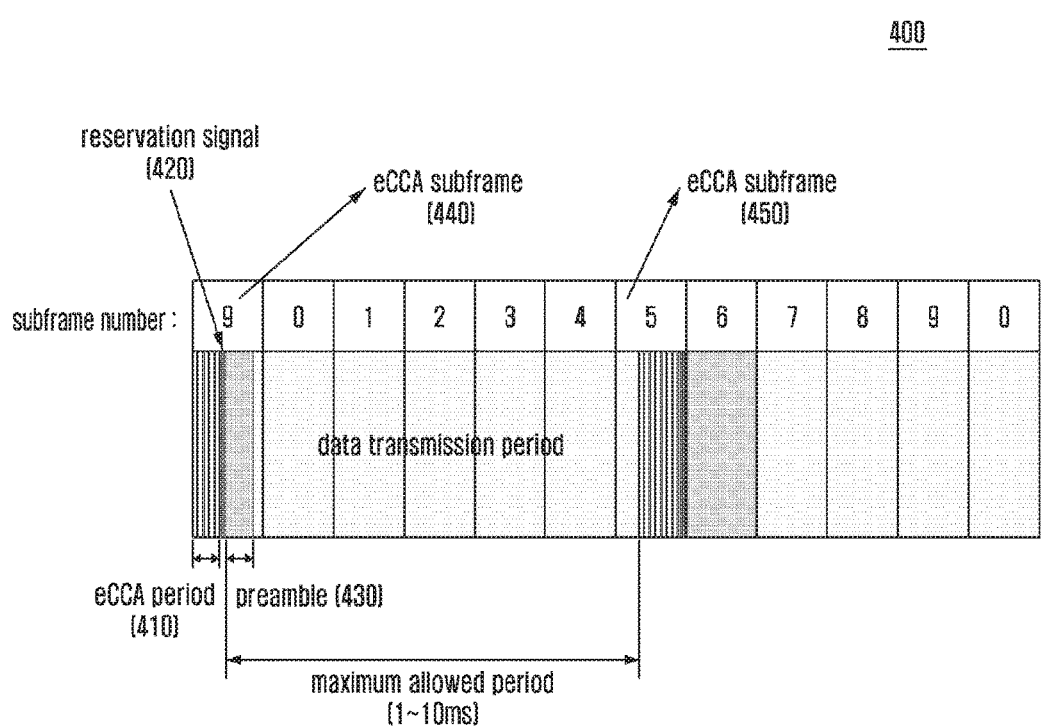
FIG. 4 is a diagram illustrating an LTE-based LAA frame structure.

FIG. 4 is a diagram illustrating an LTE-based LAA frame structure.

In reference to FIG. 4, an LAA frame 400 consists of 10 subframes, and each subframe consists of 2 slots. A slot consists of 6 or 7 orthogonal frequency division multiplexing (OFDM) symbols. The LAA frame 400 includes eCCA periods 410 for performing eCCA before transmitting data, which is unlike the legacy radio frame. The base station may receive an unlicensed frequency band signal during the eCCA period 410 in order to detect the channel occupancy condition of the unlicensed frequency band before transmitting data. In the present invention, the subframes including an eCCA period 410 as denoted by reference numbers 440 and 450 are referred to as eCCA subframes.

If it is determined that the unlicensed frequency band is idle as a result of eCCA performed during the eCCA period 410, the base station may transmit a reservation signal immediately.

In detail, if it is determined that the unlicensed frequency band is idle during the eCCA period 410 corresponding to the rando variable included in the random sequence generated by the controller, the base station may transmit the reservation signal.

The reservation signal may be transmitted between the end time of an eCCA period and the start time of data transmission to achieve symbol-level synchronization when the eCCA period is not equal in length to a multiple of the OFDM symbol length as well as for the purpose of making a reservation for preoccupying the corresponding frequency band.

After transmitting the reservation signal, the base station can transmit a preamble and a control signal.

Although the LAA frame 400 is configured based on the LTE radio frame in this embodiment, the present invention is not limited by the frame structure.

Figure 5:
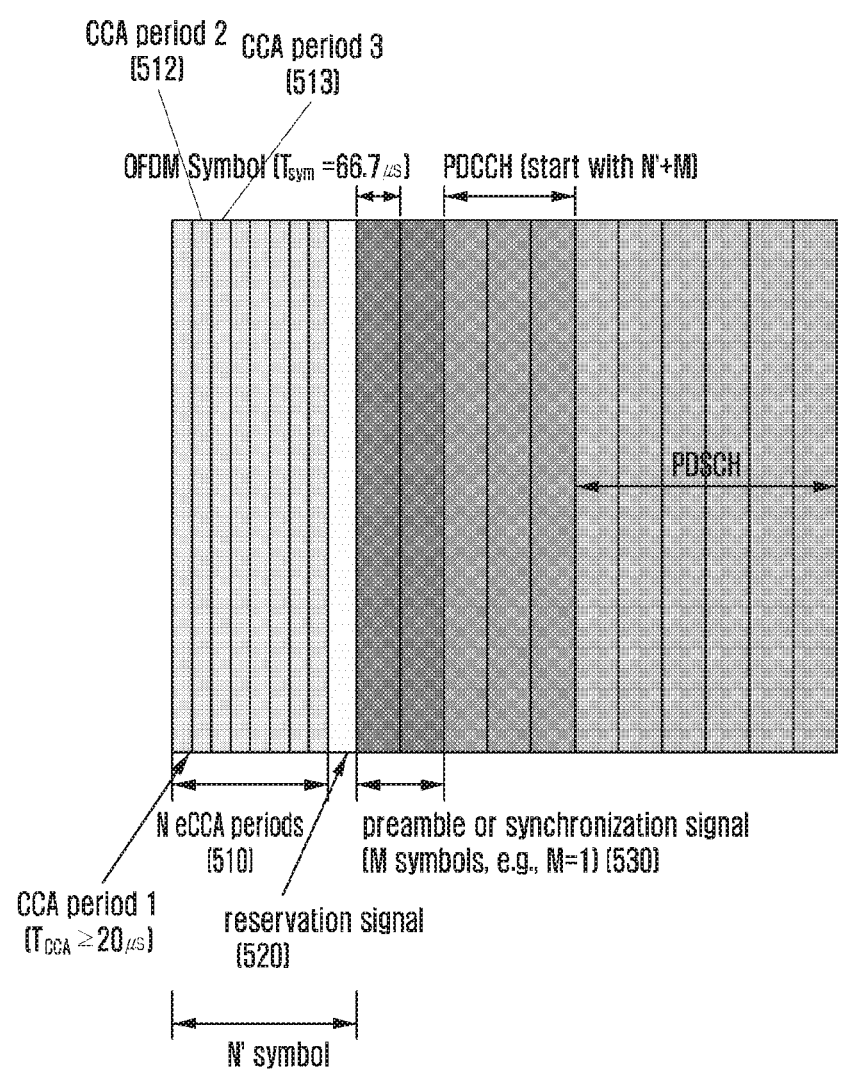
FIG. 5 is a diagram for explaining a data transmission timing estimation method of a terminal for estimating a data transmission timing of a base station in an LAA frame according to an embodiment of the present invention.

FIG. 5 is a diagram for explaining a data transmission timing estimation method of a terminal for estimating a data transmission timing of a base station in an LAA frame according to an embodiment of the present invention.

In reference to FIG. 5, the base station may generate a random sequence including random variables in a range predetermined for use in the LAA system.

Assuming that one of the random variables is N, the base station may perform eCCA for detecting a channel occupancy condition during an eCCA period comprised of N CCA periods (CCA period 1, CCA period 2, CCA period 3, . . . , CCA period N). If it is detected as a result of eCCA that the unlicensed frequency channel is idle through the N consecutive CCA periods, the base station may transmit a reservation signal 520 immediately. The reservation signal may be a signal for transmitting preamble transmitted in a symbol unit. The base station may also transmit a preamble or synchronization signal 530 following the reservation signal 520.

If the terminal knows the random variable N generated by the base station, it may estimate a symbol level preamble transmission timing.

The method for estimating a preamble transmission timing (N') may use formula (1).

$$\left\lceil \frac{N \times T_{CCA}}{T_{sym}} \right\rceil + 1 (\text{symbol}) \qquad (1)$$

Instead of performing a blind decoding, the terminal may perform decoding at the preamble transmission timing estimated with formula (1) to recover the data.

However, if the base station detects that the unlicensed frequency band is not idle through the N consecutive CCA periods, it cannot use the unlicensed frequency band. If the unlicensed frequency band is not idle through the N consecutive CCA periods, eCCA has to be performed with a new random variable as to be described with reference to FIG. 6.

Figure 6:
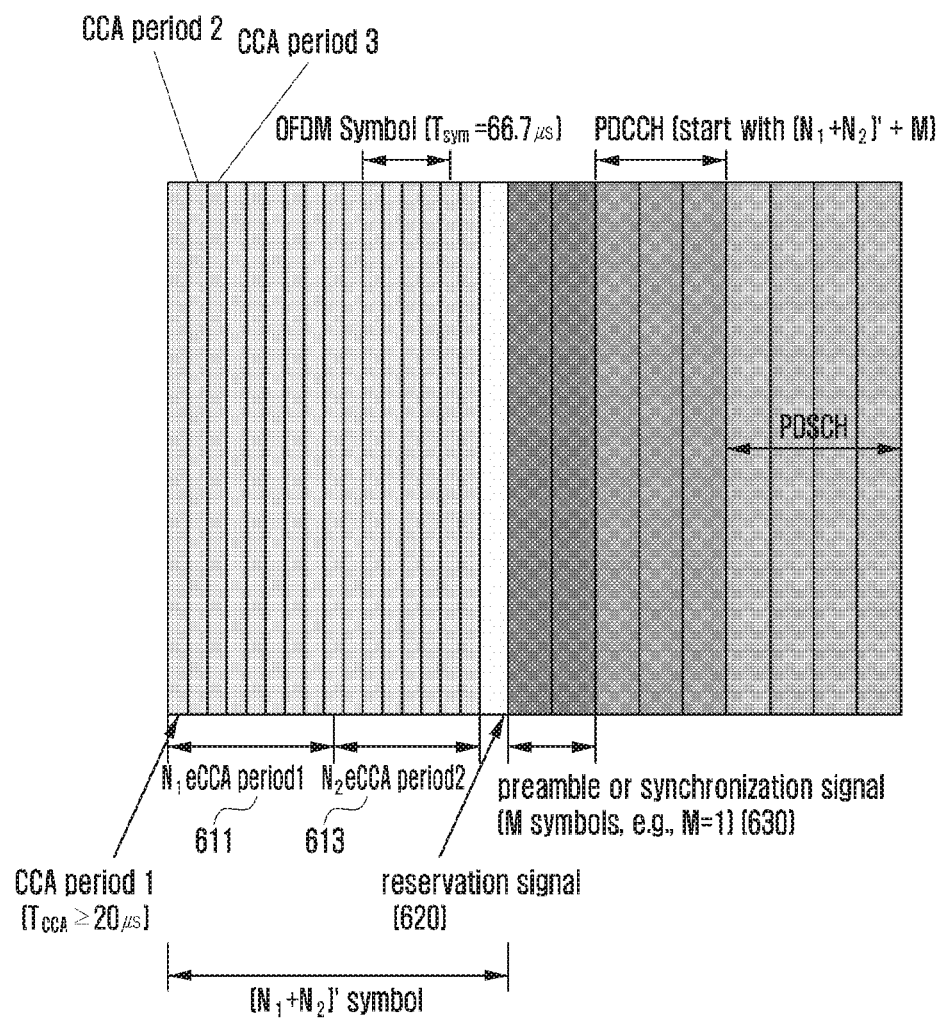
FIG. 6 is a diagram for explaining a data transmission timing estimation method of a terminal for estimating the data transmission timing of a base station in an LAA frame according to another embodiment of the present invention.

FIG. 6 is a diagram for explaining a data transmission timing estimation method of a terminal for estimating the data transmission timing of a base station in an LAA frame according to another embodiment of the present invention.

In reference to FIG. 6, the base station may generate a random sequence including a random variable selected in a range predetermined for use in the LAA system.

If a random sequence comprised of random variables of {N1, N2, . . . } is generated, the base station may perform eCCA during the eCCA period 1 611 comprised of N1 CCA periods to determine whether the unlicensed frequency band is in the idle state through the eCCA period 1 611. If it is determined that the unlicensed frequency band is not in the idle state through the eCCA period 1 611, the base station may perform eCCA during the eCCA period 2 613 comprised of N2 CCA periods to determine whether the unlicensed frequency band is in the idle state through the eCCA period 2 613. If it is determined that the unlicensed frequency band is in the idle state through the eCCA period 2 613, the base station may transmit a reservation signal 620 immediately. The reservation signal may be a signal for symbol level preamble transmission. The base station may also transmit a preamble or synchronization signal 630 after transmitting the reservation signal 620.

The random variable N2 included in the random sequence may be pre-generated and stored in advance or generated when the first eCCA fails.

In the case that a terminal knows the random sequence generated by the base station as shown in FIG. 6, it may perform decoding with the random variables included in the random sequence. That is, the terminal may estimate a preamble transmission timing with the random variable N1 to try decoding. If decoding fails, the terminal may estimate the preamble transmission timing with the sum of the first and second random variables N1 and N2 (N1+N2) and retry decoding at the estimated preamble transmission timing.

In the above case, the terminal is capable of decoding data successfully on the second try, and this means improvement of data decoding efficiency in comparison with the legacy method.

In order to try decoding at a time point determined based on the preamble transmission timing estimated with the variable N1 and then to retry decoding at a time point determined based on the preamble transmission timing estimated with the sum of two variables N1 and N2 (N1+N2), the terminal has to know the random sequence generated by the base station. The present invention proposes methods for generating a random sequence using a scheme agreed between the base station and the terminal, and the random sequence generation methods according to two embodiments are described hereinafter.

First Embodiment

The first embodiment is directed to a method for generating a random sequence in association with a subframe number between a terminal and a base station.

For example, the base station and the terminal may generate a random sequence using equation (2):

$$Y_k = (A \cdot Y_{k-1}) \bmod Q \quad (2)$$

where $Y_{-1}$ denotes an initial value generated by combining a cell identifier (ID) and a subframe number and is hereinafter referred to as an initial random sequence number. The initial random sequence number may be a cell-specific value.

The k denotes a subframe index, and A denotes a very large constant value predefined for use in the system. Q denotes the maximum value of the random variable and may be defined through radio resource control (RRC) signaling. In the following description, A is referred to as fixed value and Q is referred to as maximum random sequence number.

In reference to equation (2), the random variable Y (hereinafter, the random variable is interchangeable referred to as N and Y) for use in the first subframe may be determined based on the fixed value A as a predetermined constant value, the initial random sequence number (Y−1), and the maximum random sequence number (Q) during the random sequence generation procedure. The random variable Y1 for use in the second subframe may be determined based on the random variable Y0.

In detail, if equation (2) is used, the random variable Y1 may be a remainder obtained by dividing the multiple of the previous random variable Y0 and the fixed value by the maximum random variable. In this way, a random variable may be generated using the previous random variable, and the base station and the terminal may generate a random sequence comprised of random variables Y0, Y1, Y2, . . . .

That is, if the base station and the terminal share the fixed value, initial random sequence number, maximum random sequence number, and other information required for generating a random sequence, they may generate the same random sequence. The terminal may have the information for use in generating the random sequence or receive the information from the base station; the terminal may receive the fixed value, initial random sequence number, and maximum random sequence number to generate the same random sequence as that generated by the base station.

The base station and the terminal may generate the random sequence in advance or calculate a random variable in real time upon detection of CCA failure.

However, a random sequence generation method between the base station and the terminal is not limited by the above equation, and it may be implemented in various manners.

Second Embodiment

The second embodiment is directed to a method for generating a random sequence per subframe and generating a new random variable whenever eCCA is performed in one subframe.

For example, the base station and the terminal may generate a random sequence using equation (3):

$$Y_{k,t} = (A \cdot Y_{k,t-1}) \bmod Q \quad (3)$$

where $Y_{-1,0}$ denotes an initial random sequence number generated by combining a cell ID and a subframe number. The initial random sequence number may be a cell-specific value.

The k denotes a subframe index, and t denotes a number of eCCA attempts in the corresponding subframe. For example, t is set to 0 for the first eCCA try and changes by increments of 1 for a eCCA retry whenever the eCCA fails.

A denotes a very large constant value predefined for use in the system and is referred to as fixed value hereinafter. Q denotes the maximum value of the random variable that is defined through RRC signaling and is hereinafter referred to as maximum random sequence number.

In the case of using equation (3), the random variable Y0 for use in the first subframe may be determined based on the fixed value A as a predetermined constant value, the initial random sequence number (Y−1), and the maximum random sequence number (Q).

In detail, if equation (3) is used, t is increased to 1 when the initial eCCA fails in the first subframe, and the base station and the terminal may calculate Y−1,1 using Y−1,0. In this way, if eCCA fails in a subframe, the terminal and the base station may generate a new random variable in the same subframe and the terminal may try decoding at the preamble transmission timing calculated with the random variable.

That is, if the base station and the terminal share the fixed value, initial random sequence number, maximum random sequence number, and other information required for generating a random sequence, they may generate the same random sequence. The terminal may have the information for use in generating the random sequence or receive the information from the base station; the terminal may receive the fixed value, initial random sequence number, and maximum random sequence number to generate the same random sequence as that generated by the base station.

The terminal and the base station may generate the random sequence in advance or calculate a random variable in real time upon detection of CCA failure.

However, a random sequence generation method between the base station and the terminal is not limited by the above equation, and it may be implemented in various manners.

Figure 7:
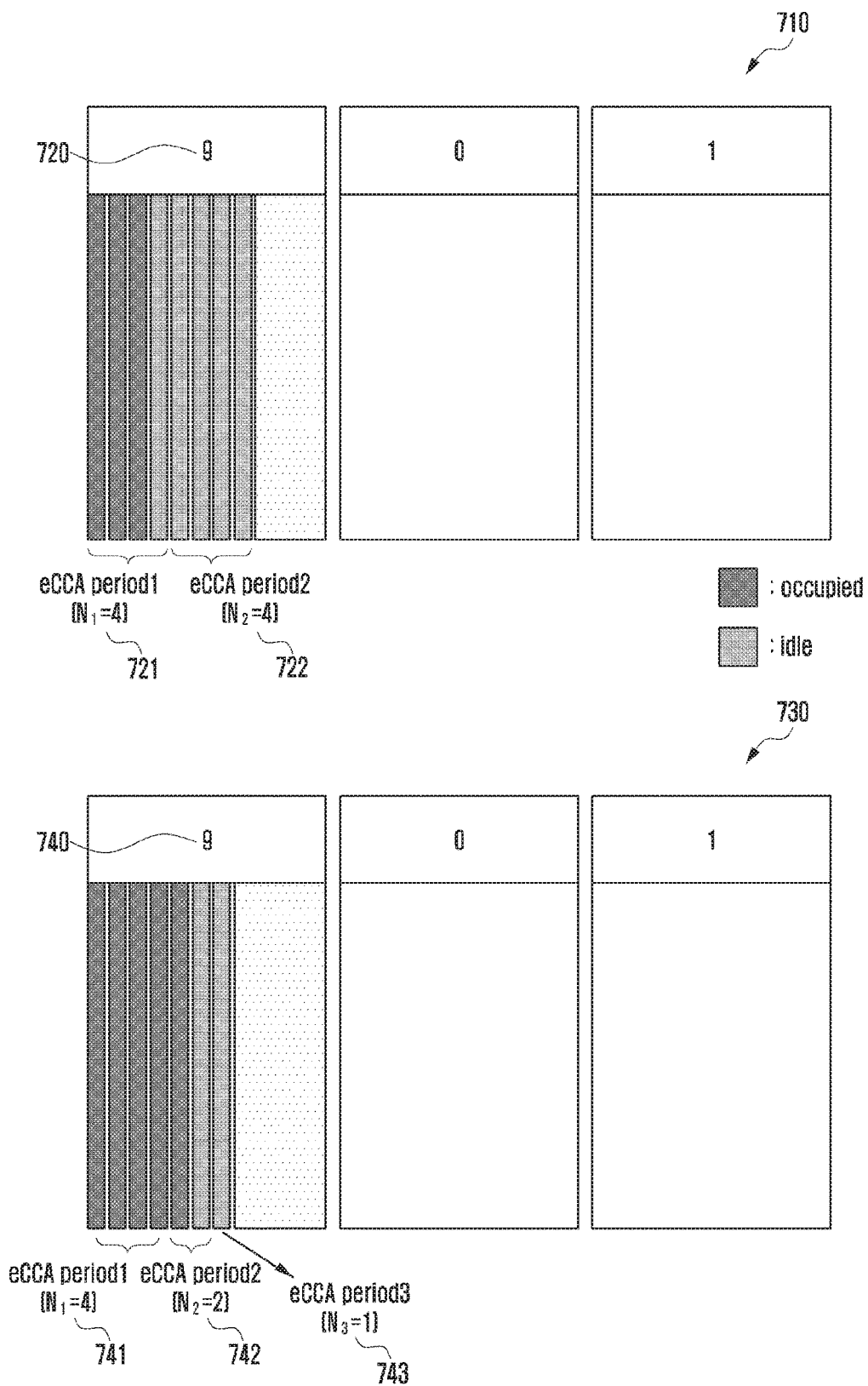
FIG. 7 is a diagram illustrating subframes to which per-subframe random variables are applied.

FIG. 7 is a diagram illustrating subframes to which per-subframe random variables are applied.

In reference to FIG. 7, the terminal and the base station may generate a random variable per subframe for performing CCA to determine whether the unlicensed frequency band is idle and to perform decoding.

In detail, the base station and the terminal may generate a random sequence comprised of random variables based on the aforementioned fixed value, maximum random sequence number, and initial random sequence number. Here, the fixed value, the maximum random sequence number, and the initial random sequence number may be predetermined values or generated by the base station. The base station may transmit the fixed value, the maximum random sequence number, and the initial random sequence number to the terminal such that the terminal and the base station generate the same random sequence.

The subframe 710 is for the case of using the random variable generated for each subframe even if the eCCA is retried in the subframe. In case the random variable N1 generated for subframe 9 720 is 4, the base station may perform eCCA during the eCCA period 1 comprised of 4 consecutive CCA periods to determine whether the unlicensed frequency band is idle through the 4 consecutive CCA periods.

Because the unlicensed frequency band is preoccupied during part of the 4 consecutive CCA periods constituting the eCCA period 1 in the subframe 9 720 as shown in the drawing denoted by reference number 710, the base station may determine as a result of the first eCCA that the unlicensed frequency channel is not idle through the eCCA period 1. Next, the base station may perform eCCA again during the eCCA period 2 comprised of 4 consecutive CCA periods according to the random variable N2, which is still set to 4 rather than a new random variable being generated.

Because the unlicensed frequency band is in the idle state during the eCCA period 2 as shown in the drawing denoted by reference number 710, the base station may transmit a reservation signal immediately after the eCCA.

From the view of the terminal, it may generate the random variable N1 set to 4 identical to that generated by the base station for subframe 9 720 and try decoding after eCCA period 1 comprised of 4 consecutive CCA periods. Since the unlicensed frequency band is preoccupied during part of the 4 consecutive CCA periods in the subframe 9 720, the terminal fails in decoding try. If it fails in decoding, the terminal may retry decoding after eCCA period 2 comprised of 4 consecutive CCA periods according to the random variable N2 that is identical in value with the random variable N1 and succeed in decoding.

As described above, the terminal tries to decode data after the eCCA period corresponding to the random variable and thus is capable of decoding data more stably and efficiently.

Alternatively, as denoted by reference number 730, it may also be possible to reduce the random variable by half to decrease the length of the eCCA period correspondingly whenever eCCA is retried in the same subframe. For example, the base station and the terminal may generate a random variable set to 4 for initial use in subframe 9 740.

The base station may perform eCCA during the eCCA period 1 741 comprised of 4 consecutive CCA periods according to the random variable to determine whether the unlicensed frequency band is in the idle state.

Because the unlicensed frequency band is preoccupied through the 4 consecutive CCA periods of the eCCA period 1 741 of subframe 9 740, the base station may determine that the unlicensed frequency band is not in the idle state during the eCCA period 1 741.

The base station may reduce the value of the per-subframe random variable by half whenever it retries the eCCA in the same subframe. If the random variable reaches 1, the terminal and the base station may re-generate the random variable or use the random variable set to 1 until accessing the channel succeeds.

Then, the base station may perform eCCA during the eCCA period 2 742 comprised of 2 consecutive CCA periods to determine whether the unlicensed frequency band is in the idle state. Because the unlicensed frequency band is preoccupied in part of the 2 consecutive CCA periods of the eCCA period 2 724 of subframe 9 740 as shown in the drawing denoted by reference number 730, the base station may determine that the unlicensed frequency band is not in the idle state.

Accordingly, the base station may reduce the random variable by half so it becomes 1 and perform eCCA during the eCCA period 3 743 comprised of 1 CCA period to determine whether the unlicensed frequency band is in the idle state. Because the unlicensed frequency band is in the idle state during the eCCA period 3 743 of subframe 9 740 as shown in the drawing denoted by reference number 730, the base station may transmit a reservation signal.

From the view of the terminal, it may generate the random variable set to 4 identical to that generated by the base station for subframe 9 740. Accordingly, the terminal may try decoding after eCCA period 1 741 comprised of 4 consecutive CCA periods. Since the unlicensed frequency band is preoccupied through the 4 consecutive CCA periods in the subframe 9 740, the terminal fails in decoding. If it fails in decoding, the terminal may reduce the value of the random variable by half to 2 and try decoding after the eCCA period 2 742 comprised of 2 consecutive CCA periods; because the unlicensed frequency band is preoccupied in part of the 2 consecutive CCA periods of the eCCA period 2 742 of subframe 9 740, the terminal fails in decoding. Accordingly, the terminal may reduce the value of the random variable by half to 1 and try decoding; because the unlicensed frequency band is in the idle state in the eCCA period 4 743 of subframe 9 740 as shown in the drawing denoted by reference number 730, the terminal succeeds in decoding.

The above method makes it possible to increase the channel access probability in an environment harsh for channel access by reducing the value of the random variable between the base station and the terminal.

As described above, the terminal tries decoding data after the eCCA period corresponding to the random variable, and this makes it possible for the terminal to decode data stably and efficiently.

Figure 8:
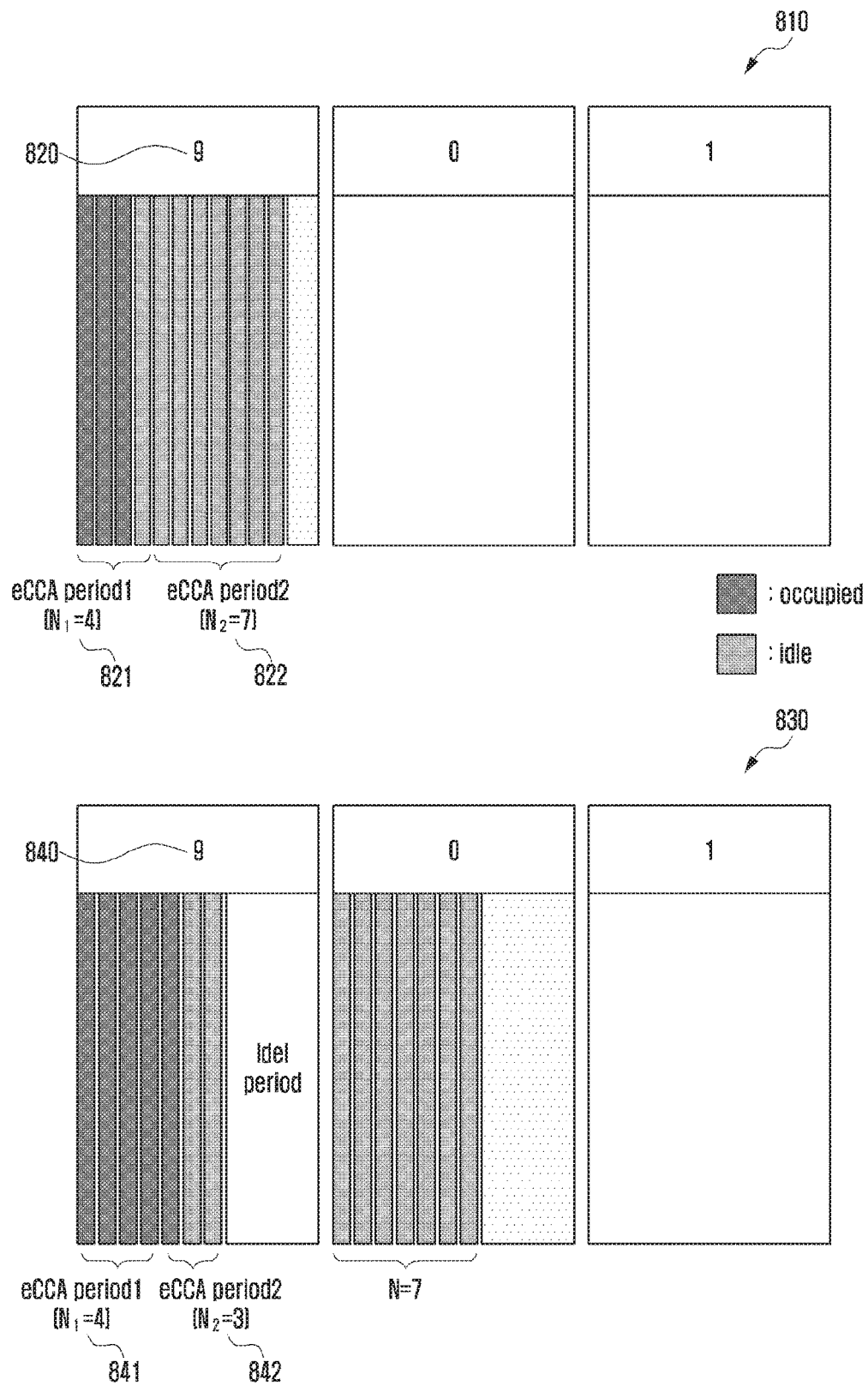
FIG. 8 is a diagram illustrating a method for generating a per-subframe random variable and updating the random variable whenever eCCA fails in the same subframe.

FIG. 8 is a diagram illustrating a method for generating a per-subframe random variable and updating the random variable whenever eCCA fails in the same subframe.

In the case of retrying eCCA in the same subframe, a new random variable is generated as denoted by reference number 810. In case the random variable N1 generated for use in subframe 9 820 is 4, the base station may perform eCCA during the eCCA period 1 comprised of 4 consecutive CCA periods according to the generated random variable to determine whether the unlicensed frequency band is in the idle state through the 4 consecutive CCA periods.

Because the unlicensed frequency band is preoccupied in part of the 4 consecutive CCA periods of the eCCA period 1 821 of the subframe 9 720 as shown in the drawing denoted by reference number 810, the base station may determine, as a result of the first eCCA, that the unlicensed frequency band is not in the idle state through the eCCA period 1 821.

The base station and the terminal may generate a new random variable for use in a subframe using the method of the second embodiment.

In case the new random variable generated by the base station and the terminal is 7, the base station may perform eCCA during the eCCA period 2 822 comprised of 7 consecutive CCA periods and, because the unlicensed frequency band is in the idle state through the eCCA period 2 822 as shown in the drawing denoted by reference number 810, transmit a reservation signal after performing the eCCA.

Meanwhile, the terminal may generate a random variable N1 set to 4 identical to that generated by the base station for subframe 9 820 and try decoding after the eCCA period 1 comprised of 4 consecutive CCA periods. Because the unlicensed frequency band is occupied in part of the CCA periods constituting the eCCA period 1 821 of subframe 9 820 as shown in the drawing denoted by reference number 810, the terminal fails in decoding. If decoding fails, the terminal may generate a new random variable N2 set to 7 and retry decoding after eCCA period 2 comprised of 7 consecutive CCA periods according to the new random variable; the terminal may succeed in decoding.

However, the random variable N2 may be generated when the result of the eCCA performed at the base station and the terminal is negative, and the random variable may be included in a random sequence generated in advance by the base station and the terminal.

Because the random variable may still be updated even in one subframe as described above, it may be possible to reduce signal collision probability between LAA systems or between devices operating in the same unlicensed frequency band.

Alternatively, it may be possible to update the random variable whenever the eCCA is performed in one subframe while restricting a number of eCCA operations as shown in the drawing denoted by reference number 830.

Similar to the case of the drawing denoted by reference number 810, the base station and the terminal may generate a new random variable whenever performing eCCA. However, if the number of eCCA operations exceeds a predetermined value, the base station and the terminal designate the remaining part of the subframe as an idle period and performing of eCCA is stopped until the next subframe.

It is assumed that the first and second random variables generated by the base station and the terminal for use in subframe 9 840 are 4 and 3, respectively, and the number of eCCA operation is limited to 2 as in the drawing denoted by reference number 830.

The base station performs eCCA during the eCCA period 1 comprised of 4 CCA periods according to the first random variable and detects that the unlicensed frequency band is preoccupied in part of the CCA periods constituting the eCCA period 1 841. As a consequence, the base station may determine that the unlicensed frequency band is not in the idle state through the eCCA period 1 841.

Afterward, the base station may try eCCA during the eCCA period 2 comprised of 3 consecutive CCA periods according to the second random variable and detect that the unlicensed frequency band is preoccupied in part of the CCA periods constituting the eCCA period 2 842; as a consequence, the base station may determine that the unlicensed frequency band is not in the idle state through the eCCA period 2 842. Then, the base station cannot perform eCCA anymore because the number of eCCA operations is limited to 2 in the same subframe, and the remaining part of the subframe 9 840 is designated as an idle period.

The base station may perform eCCA in the next subframe, i.e., subframe 0 850, to determine whether the unlicensed frequency band is in the idle state.

Figure 9:
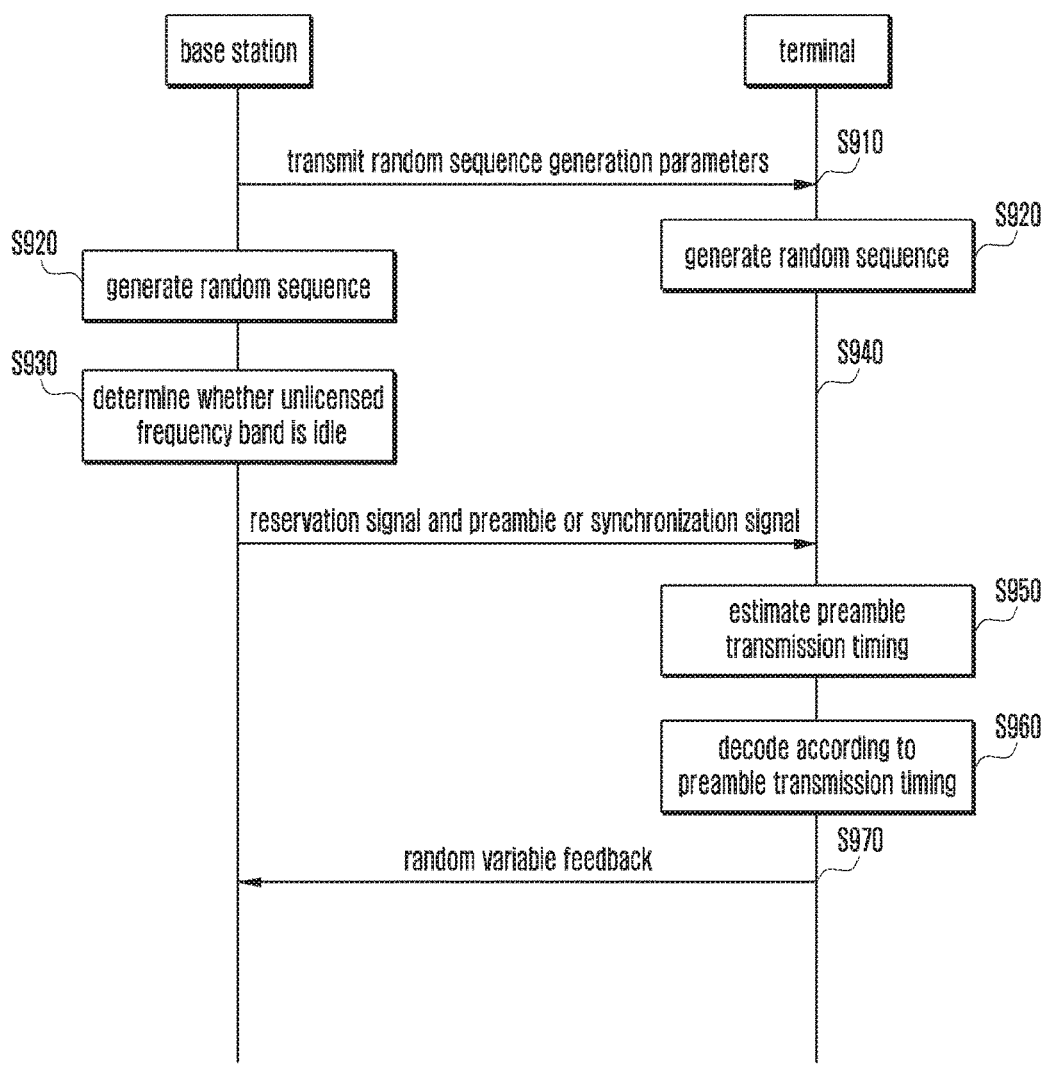
FIG. 9 is a signal flow diagram illustrating a method for generating control information for use in decoding data transmitted in an unlicensed frequency band in a wireless communication system according to an embodiment of the present invention.

FIG. 9 is a signal flow diagram illustrating a method for generating control information for use in decoding data transmitted in an unlicensed frequency band in a wireless communication system according to an embodiment of the present invention.

In reference to FIG. 9, at step S910 a base station may transmit random sequence generation parameters as the information for use in generating the control information. Here, the control information for use in decoding data may include a random sequence comprised of random variables. The random sequence generation parameters may include the aforementioned fixed value, initial random sequence number, and maximum random sequence number.

After transmitting the random sequence generation parameters, the base station and the terminal may generate a random sequence using the random sequence generation parameters at step S920.

After generating the random sequence, the base station may determine at step S930 whether an unlicensed frequency band is in the idle state based on the random variables included in the random sequence. If it is determined that the unlicensed frequency band is in the idle state, the base station may transmit to the terminal a reservation signal and a preamble or synchronization signal at step S940.

After generating the random sequence, the terminal may estimate a preamble transmission timing at step S950 according to the random variable included in the random sequence.

Next, the terminal may performing decoding according to the preamble transmission timing at step S960. If the terminal fails in decoding, it may calculate the preamble transmission timing based on the next random variable and retry decoding according to the preamble transmission timing until it succeeds in decoding.

After decoding data, the terminal may perform feedback of random variable periodically or aperiodically at step S970 to determine whether the random sequences generated by the terminal and the base station match and whether a synchronization is achieved therebetween. If synchronization is not achieved, even though the terminal and the base station have generated the same random sequence, the terminal cannot estimate the preamble transmission timing accurately. Accordingly, if the random sequence transmitted by the terminal and the random sequence used by the base station do not match, the base station may transmit the random variable in use to the terminal to achieve synchronization between the base station and the terminal.

Figure 10:
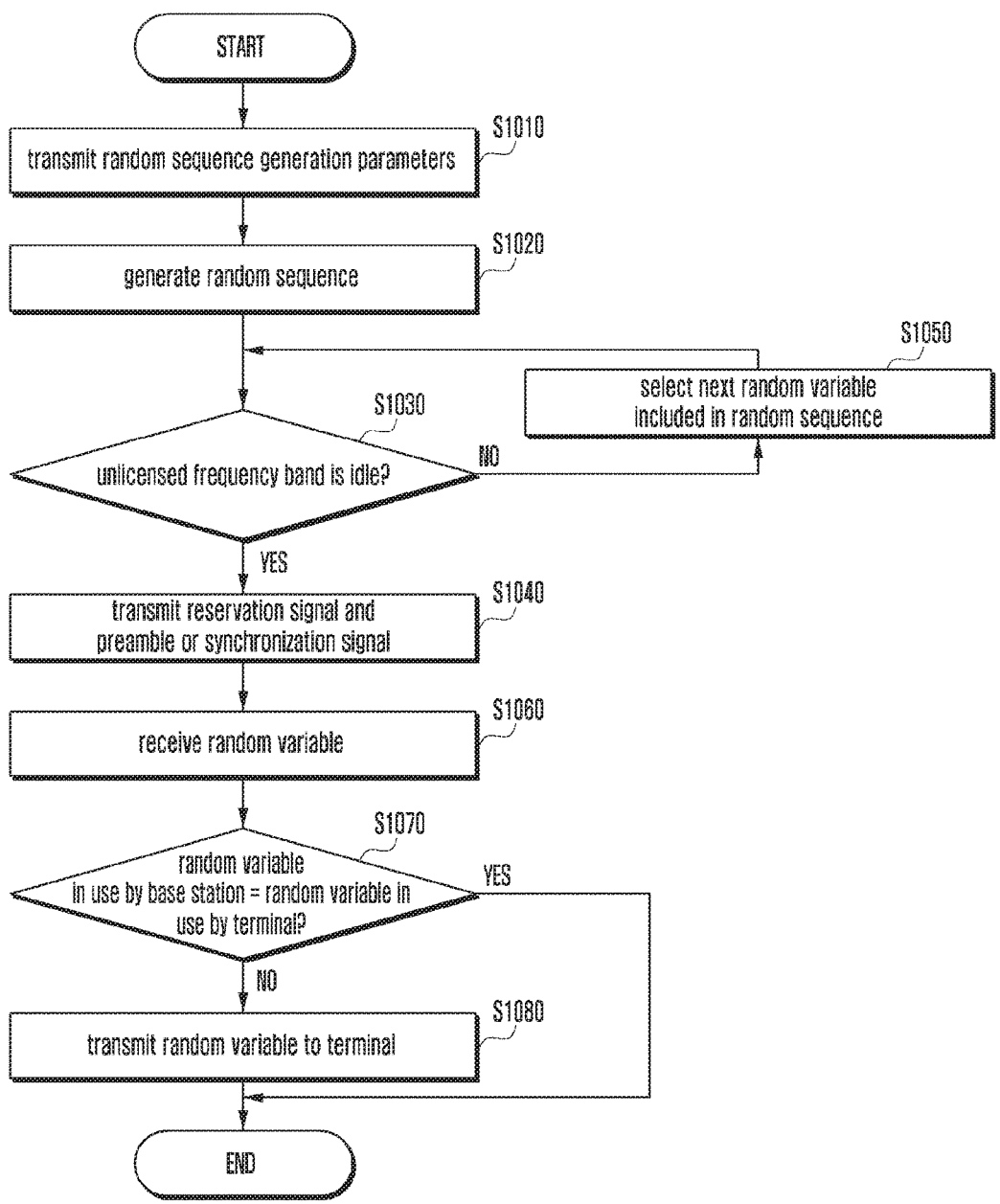
FIG. 10 is a flowchart illustrating operations of a base station for generating control information for use in decoding data transmitted in an unlicensed frequency band according to an embodiment of the present invention.

FIG. 10 is a flowchart illustrating operations of a base station for generating control information for use in decoding data transmitted in an unlicensed frequency band according to an embodiment of the present invention.

In reference to FIG. 10, the base station may transmit random sequence generation parameters to a terminal at step S1010. The random sequence generation parameters may include the aforementioned fixed value, initial random sequence number, and maximum random sequence number.

The base station may generate a random sequence using the parameters at step S1020. The random sequence is generated in a similar method to that described with reference to FIG. 6 and thus a detailed description of the random sequence generation method is omitted herein.

After generating the random sequence, the base station may determine whether the unlicensed frequency band is in the idle state using a random variable included in the random sequence at step S1030.

If it is determined that the unlicensed frequency band is in the idle state, the base station may transmit a reservation signal and a preamble or synchronization signal at step S1040. Otherwise, if it is determined that the unlicensed frequency band is not in the idle state, the base station may determine whether the unlicensed frequency band is in the idle state again selecting the next random variable included in the random sequence and using the random variable at step S1050.

Meanwhile, the base station may receive a feedback including the random variable from the terminal at step S1060.

The reason for receiving the random variable as feedback is to determine whether or not the random variable used by the base station and the random variable used by the terminal identical to each other.

The base station may determine at step S1070 whether the random variables used by the base station and the terminal match and, if it is determined that the random variables match, transmit the random variable to the terminal at step S1080.

Figure 11:
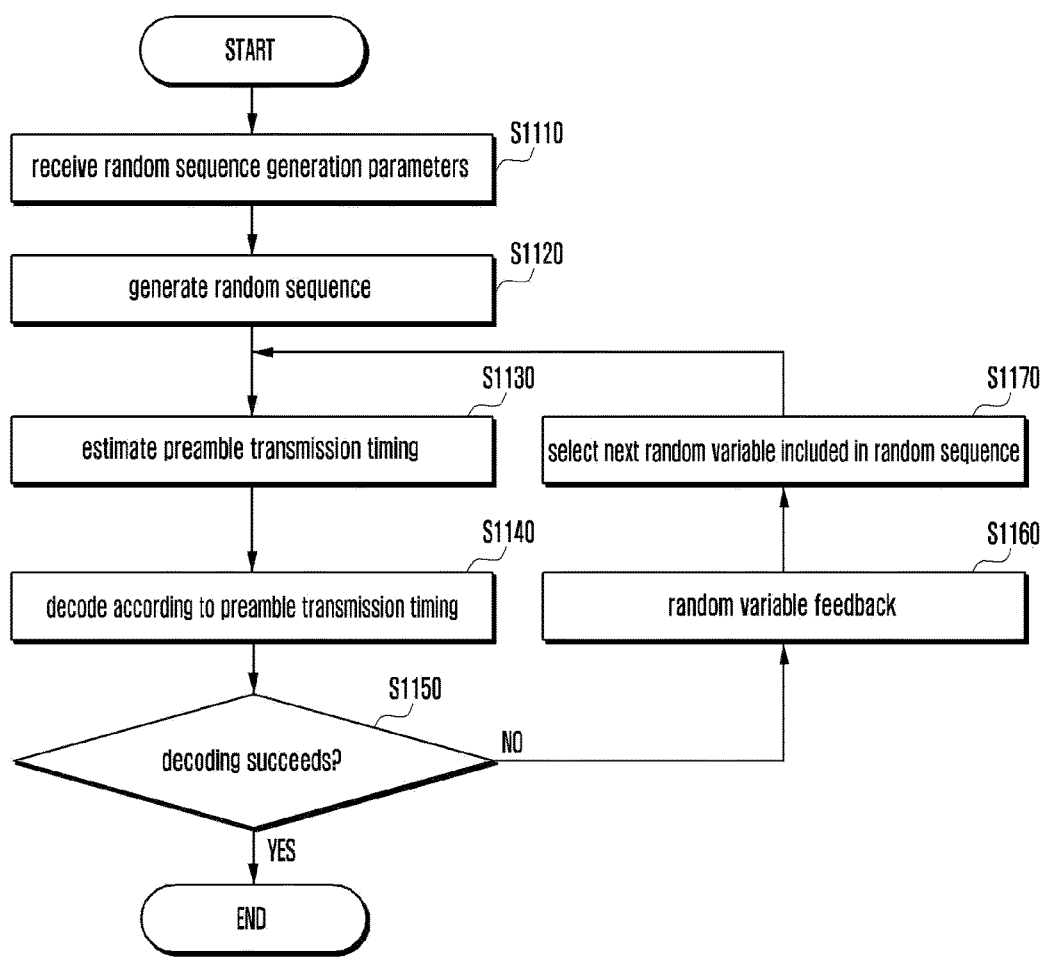
FIG. 11 is a flowchart illustrating operations of a terminal for generating control information for use in decoding data transmitted in an unlicensed frequency band according to an embodiment of the present invention.

FIG. 11 is a flowchart illustrating operations of a terminal for generating control information for use in decoding data transmitted in an unlicensed frequency band according to an embodiment of the present invention.

In reference to FIG. 11, the terminal may receive random sequence generation parameters from a base station at step S1110. The random sequence generation parameters may include the aforementioned fixed value, initial random sequence number, and maximum random sequence number.

The terminal may generate a random sequence using the parameters at step S1120. The random sequence may be generated in a similar method to that described with reference to FIG. 6 and thus a detailed description of the random sequence generation method is omitted herein.

After generating the random sequence, the terminal may estimate a preamble transmission timing based on a random variable included in the random sequence at step S1130.

Next, the terminal may perform decoding according to the preamble transmission timing at step S1140. If the terminal fails in decoding, it may estimate the preamble transmission timing again based on the next random variable included in the random sequence and retry decoding according to the estimated preamble transmission timing.

The terminal may determine at step S1150 whether the decoding succeeds.

If the decoding fails, the terminal may transmit a feedback including the random variable to the base station at step S1160. The reason for the feedback including the random variable is to determine whether the random variables in use by the terminal and the base station match and whether a synchronization is achieved therebetween. If there is a failure to achieve synchronization even when the terminal and the base station generate the same random sequence, the terminal may not estimate the preamble transmission timing accurately.

Although the above description is directed to the case where the random variable is fed back when the terminal fails in decoding, the present invention is not limited thereto and may be applicable to the case where the random variable is fed back periodically or aperiodically.

After transmitting the feedback, the terminal may select the next random variable included in the random sequence at step S1170 to re-estimate the preamble transmission timing and retry decoding.

Figure 12:
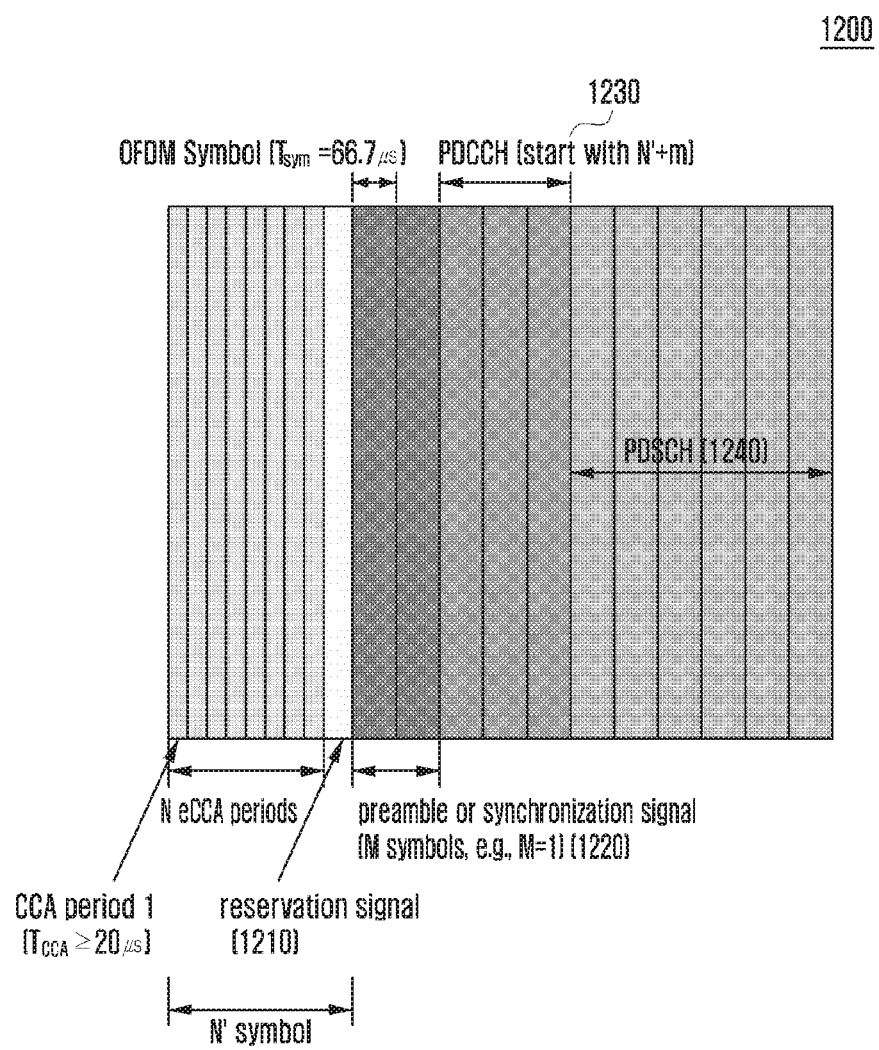
FIG. 12 is a diagram for explaining a data transmission timing determination method of a base station according to an embodiment of the present invention.

FIG. 12 is a diagram for explaining a data transmission timing determination method of a base station according to an embodiment of the present invention.

If it is determined that the unlicensed frequency band is in the idle state as a result of eCCA performed during an eCCA period comprised of a number of CCA periods predetermined according to a random variable, the base station may transmit a reservation signal 1210, a preamble or synchronization signal 1220, a physical downlink control channel (PDCCH) 1230, and a physical downlink shared channel (PDSCH) 1240 in sequence. The drawing exemplifies a case where the start time point of data transmission varies dynamically.

In reference to FIG. 12, the length of the preamble may be comprised of M symbols in the LAA system. In the embodiment of FIG. 12, it is assumed that the length of the preamble is preset to 2 symbols.

Once it is determined to transmit data according to the result of eCCA, the start time points of the PDCCH 1230 and PDSCH 1240 may vary according to the preset length of the preamble. The terminal may estimate the preamble transmission timing to try decoding and determine the start time point of the PDCCH based on the control signal included in the preamble. Likewise, the terminal may determine the PDSCH region based on the PDCCH to decode data in the whole LAA frame.

Figure 13:
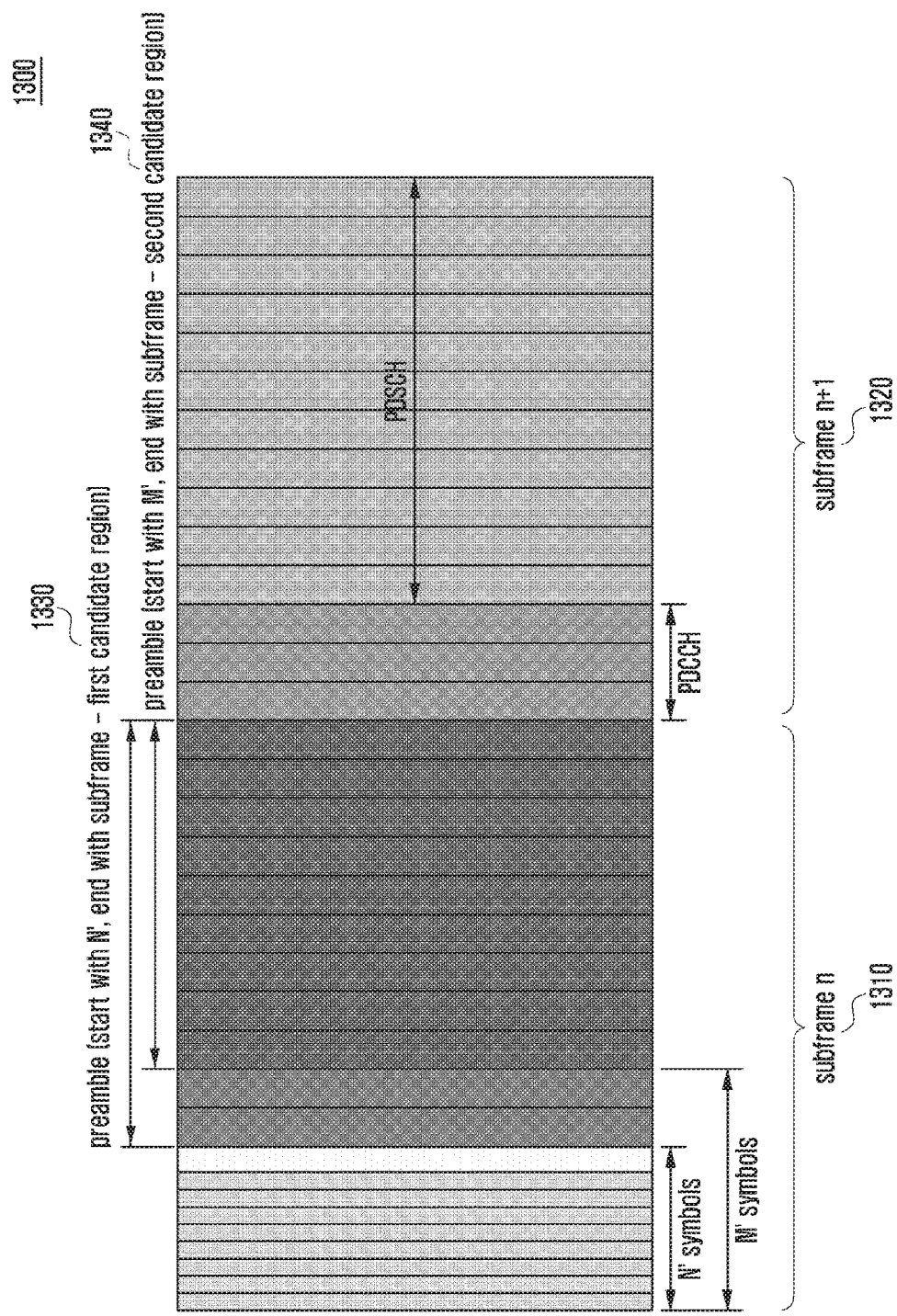
FIG. 13 is a diagram illustrating a data transmission timing determination method of a base station according to another embodiment of the present invention.

FIG. 13 is a diagram illustrating a data transmission timing determination method of a base station according to another embodiment of the present invention.

In reference to FIG. 13, a PDCCH transmission timing may be predefined in the LAA system. As shown in FIG. 13, PDCCH is transmitted in subframe n+1 1320.

In this case, the length of the preamble transmitted by the base station may vary according to the result of eCCA. The base station may include extra control signals in the preamble according to the length of the preamble. For example, the base station may include a reference signal for channel estimation, synchronization signal, and/or precoding information in the preamble to reduce the data amount to be conveyed in PDCCH and PDSCH. The preamble transmitted from the base station to the terminal may include data as well as control information.

The base station may transmit to the terminal a downlink control indicator (DCI) indicating the type of extra information included in the preamble at the beginning of the preamble.

The terminal may perform blind decoding in a first candidate region 1330 in consideration of the first eCCA period and, if preamble decoding fails, then in a second candidate region 1340 in consideration of the second eCCA period.

Even when it fails to estimate the preamble transmission timing because the channel condition is bad, the terminal may acquire control information through blind decoding of PDCCH to decode data in the whole LAA frame.

Although preferred embodiments of the invention have been described using specific terms, the specification and drawings are to be regarded in an illustrative rather than a restrictive sense in order to help understand the present invention. It is obvious to those skilled in the art that various modifications and changes can be made thereto without departing from the broader spirit and scope of the invention.

The invention claimed is:

1. A data reception method of a terminal in a mobile communication system operating in a first and second band, the method comprising:
   receiving in the first band, from a base station, random sequence generation parameters for generating a random sequence including a random variable;
   generating the random sequence using the random sequence generation parameters; and
   decoding data in the second band based on the random variable included in the random sequence,
   wherein the first band comprises a licensed frequency band, the second band comprises an unlicensed frequency band, and the random sequence generation parameters include at least one of an initial random sequence number, a maximum random sequence number, and a fixed value.

2. The method of claim 1, wherein generating the random sequence comprises generating the random sequence based on the random variable generated per subframe, and
   wherein decoding the data comprises transmitting a feedback including a random variable to the base station, the random variable included in the feedback being identical to the random variable generated by the base station.

3. The method of claim 1, wherein decoding comprises:
   estimating a preamble transmission timing based on the random variable; and
   decoding the data in a subframe corresponding to the preamble transmission timing.

4. A data transmission method of a base station in a mobile communication system operating in a first and second band, the method comprising:
   transmitting in the first band, to a terminal, random sequence generation parameters for generating a random sequence including a random variable;
   generating the random sequence using the random sequence generation parameters; and
   determining whether the second band is idle based on the random variable included in the random sequence,
   wherein the first band comprises a licensed frequency band, the second band comprises an unlicensed band,
   wherein the random variable is used for decoding in a subframe corresponding to the random variable, and
   wherein the random sequence generation parameters include at least one of an initial random sequence number, a maximum random sequence number, and a fixed value.

5. The method of claim 4, wherein determining whether the second band is idle comprises:
   receiving a feedback including a random variable from the terminal; and
   comparing the random variable received from the terminal and the random variable generated by the base station; and
   transmitting, when the random variable received from the terminal and the random variable generated by the base station are not identical to each other, the random variable of the base station to the terminal,
   wherein the random variable is used for estimating a preamble transmission timing which is used to decode data in a subframe corresponding to the preamble transmission timing.

6. A terminal of a mobile communication system operating in a first and a second band, the terminal comprising:
   a transceiver; and
   a controller configured to:
   receive in the first band, via the transceiver, random sequence generation parameters for generating a random sequence including a random variable,
   generate the random sequence using the random sequence generation parameters, and
   decode data in the second band based on the random variable included in the random sequence,
   wherein the first band comprises a licensed frequency band, the second band comprises an unlicensed frequency band, and the random sequence generation parameters include at least one of an initial random sequence number, a maximum random sequence number, and a fixed value.

7. The terminal of claim 6, wherein the controller is further configured to:
   generate the random sequence based on the random variable generated per subframe; and
   transmit a feedback including a random variable to a base station, the random variable included in the feedback being identical to the random variable generated by the base station.

8. The terminal of claim 6, wherein the controller is further configured to:
   estimate a preamble transmission timing based on the random variable; and
   decode the data in a subframe corresponding to the preamble transmission timing.

9. A base station of a mobile communication system operating in a first and second band, the base station comprising:
   a transceiver; and
   a controller configured to:
   transmit in the first band, via the transceiver, random sequence generation parameters for generating a random sequence including a random variable in the first band,
   generate the random sequence using the random sequence generation parameters, and
   determine whether the second band is idle based on the random variable included in the random sequence,
   wherein the first band comprises a licensed frequency band and the second band comprises an unlicensed band, and
   wherein the random variable is used for decoding in a subframe corresponding to the random variable.

10. The base station of claim 9, wherein the controller is further configured to:
    receive a feedback including a random variable from a terminal,
    compare the random variable received from the terminal and the random variable generated by the base station, and
    transmit, when the random variable received from the terminal and the random variable generated by the base station are not identical to each other, the random variable of the base station to the terminal,
    wherein the random variable is used for estimating a preamble transmission timing which is used to decode data in a subframe corresponding to the preamble transmission timing.

11. The base station of claim 9, wherein the random sequence generation parameters include at least one of an initial random sequence number, a maximum random sequence number, and a fixed value.

* * * * *